United States Patent
Gonsalves et al.

(10) Patent No.: US 7,429,988 B2
(45) Date of Patent: Sep. 30, 2008

(54) METHODS AND APPARATUS FOR CONVENIENT CHANGE OF DISPLAY CHARACTERS ON A HANDHELD DEVICE

(75) Inventors: Brian Gonsalves, Concord, CA (US); Kent Perkins, Antioch, CA (US); Zesen Chen, Pleasanton, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 44 days.

(21) Appl. No.: 11/368,811

(22) Filed: Mar. 6, 2006

(65) Prior Publication Data
US 2007/0206015 A1 Sep. 6, 2007

(51) Int. Cl.
- G06T 11/00 (2006.01)
- G09G 5/26 (2006.01)
- G09G 5/00 (2006.01)
- G06F 3/02 (2006.01)
- H04Q 7/20 (2006.01)

(52) U.S. Cl. ............... 345/472; 345/169; 345/157; 345/467; 455/456.1; 455/456.3; 455/566

(58) Field of Classification Search ......... 345/467–472, 345/169, 157; 455/456.1–456.3, 566
See application file for complete search history.

(56) References Cited

U.S. PATENT DOCUMENTS

| | | | |
|---|---|---|---|
| 5,615,384 A | 3/1997 | Allard et al. | |
| 5,786,776 A | 7/1998 | Kisaichi et al. | |
| 5,956,034 A * | 9/1999 | Sachs et al. | 715/776 |
| 6,144,389 A * | 11/2000 | Toshimoto et al. | 345/472 |
| 6,215,479 B1 | 4/2001 | Matsui | |
| 6,243,080 B1 | 6/2001 | Molne | |
| 6,433,801 B1 | 8/2002 | Moon et al. | |
| 6,570,583 B1 * | 5/2003 | Kung et al. | 345/661 |
| 6,639,586 B2 | 10/2003 | Gerpheide | |
| 6,775,560 B2 | 8/2004 | King et al. | |
| 6,879,842 B2 | 4/2005 | King et al. | |
| 6,995,749 B2 * | 2/2006 | Friend | 345/169 |
| 7,031,728 B2 * | 4/2006 | Beyer, Jr. | 455/456.3 |
| 7,075,513 B2 * | 7/2006 | Silfverberg et al. | 345/157 |
| 7,146,178 B2 * | 12/2006 | Lehikoinen et al. | 455/456.1 |
| 7,266,394 B2 * | 9/2007 | Carlson et al. | 455/566 |
| 2002/0109687 A1 * | 8/2002 | Ishii et al. | 345/472.2 |
| 2004/0100479 A1 | 5/2004 | Nakano et al. | |
| 2005/0027525 A1 | 2/2005 | Funakura | |
| 2005/0237319 A1 * | 10/2005 | Ranganathan et al. | 345/214 |

* cited by examiner

Primary Examiner—Jin-Cheng Wang
(74) Attorney, Agent, or Firm—Hanley, Flight & Zimmerman, LLC

(57) ABSTRACT

A method and apparatus for convenient changing of a character display on a handheld device is disclosed. An example handheld device includes a screen to display an alphanumeric character, the alphanumeric character being displayable in at least two different font sizes. A user input device enables selection between the at least two different font sizes. The device includes a processor responsive to the user input device to change the font size of the alphanumeric character. A second user input device is provided to change the brightness of the screen when a user touches the second control device.

9 Claims, 6 Drawing Sheets

METHODS AND APPARATUS FOR CONVENIENT CHANGE OF DISPLAY CHARACTERS ON A HANDHELD DEVICE

FIELD OF THE DISCLOSURE

The present disclosure relates generally to handheld devices and, more specifically, to methods and apparatus for a convenient change of display characteristics on a handheld device.

BACKGROUND

Handheld portable devices such as cellular telephones have a screen which show, among other things, previous phone numbers called or the phone number the user wishes to call. However, telephone functions are only one feature of current handheld portable devices. For example, in handheld devices such as cell phones, many functions such as a web browser, a timer, an alarm clock, a calendar, a media player, a camera etc. may be used. As such devices have increased in functionality, different screens are displayed to communicate more information and provide more options to a user. Further, there are many more items on each screen to accommodate different functions. Such functions require screen space and thus crowd a screen As a result, it becomes more difficult for a user to focus on the characters on the screen that perform the function desired.

Currently, adjusting the display in order to highlight certain characters, such as by displaying these characters in a larger font, is a cumbersome process involving using multiple keys to access a sequence of instructions via the keypad. For example on certain cell phones, a user must select a menu which is displayed on the screen, make a selection on the menu, and then confirm the instruction to change the character display. Such complexity inhibits a user's ability to efficiently use the device since most users will simply not take advantage of the different sized display of the characters because of the complexity of the steps to adjust the display. Further when on a call, a user cannot adjust characters on the screen readily in order to better view the characters.

More specifically, more complex cellular phones and/or PDA's typically have a home screen/display and other screens/displays that can be reached from the home screen/display. A home screen is typically a screen to which the cell phone/PDA defaults to on start-up. It typically provides one or more icons that can be selected to reach other screens and/or menus. Other screens include a settings screen wherein various features of the cell phone (e.g., color style, wallpaper, ring tones, ring volume, hot key assignments, etc.) can be selected. Cell phones/PDAs also typically include a dialing/addressing screen wherein a phone number or email address can be entered to initiate a communication session with another device. If a user wishes to adjust the display characteristics of the cell phone/PDA, it may be necessary to leave the home screen and/or the dialing/addressing screen and enter the settings screen, a cumbersome process.

DETAILED DESCRIPTION

In general, the example monitoring methods and apparatus described herein enable a convenient changing of a character display on a handheld device. An example handheld device includes a receiver to receive wireless signals and a transmitter to send wireless signals. A screen is provided to display an alphanumeric character, the alphanumeric character being displayable in at least two different font sizes. A memory stores at least one set of processor instructions involving the display of an alpha numeric character. A processor is coupled to the screen, memory, receiver and transmitter, the processor executes the at least one set of processor instructions. A user input device is provided to enable selection between the at least two different font sizes. A user input device enables selection between the at least two different font sizes. The processor is responsive to the user input device to change the font size of the alphanumeric character.

Figure 1:
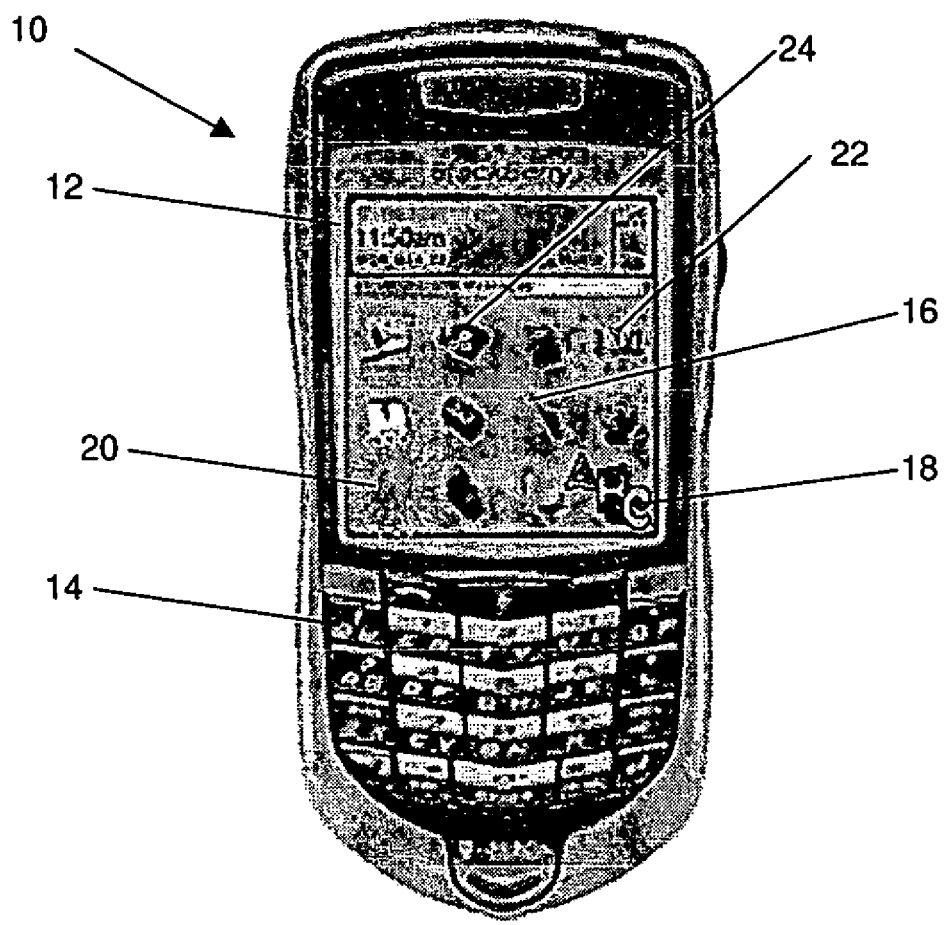
FIG. 1 shows an example handheld device which provides for a convenient screen based adjustment of character presentation.

FIG. 1 depicts an example handheld device 10 which provides integrated voice and electronic mail services with which the example character control methods and apparatus described herein may be implemented. The example handheld device 10 of FIG. 1 is a PDA/cellular telephone, but will be understood by those of ordinary skill in the art that any portable handheld device including a PDA, MP3 player, media player, cell phone etc. may be used. The PDA/cellular telephone 10 in the illustrated example includes a screen 12 and a keypad 14. The screen 12 is a touch screen sensitive screen which is a user input device and includes a display area 16 with a control device area defined with a size button 18 and a brightness area button 20 in this example. In this example, the display area 16 is configured as a home screen allowing other icons 22 to be displayed in the display area 12 to provide access to various other functions and/or screens when touched or otherwise selected by the user. Selecting an icon 22 activates software and/or hardware on the PDA/cellular telephone 10 to perform an associated function and/or a screen related to the function. For example, a telephone icon 24 may be selected to enable the PDA/cellular telephone 10 to make or receive telephone calls. The screen 12 in the illustrated example is a liquid crystal display (LCD) but other suitable displays such as plasma, backlit LCD etc. may alternatively be used. The screen 12 has a certain default brightness level which is automatically activated whenever the user touches the screen 12 or any key on the keypad 14.

In this example, the buttons 18 and 20 are rendered on the bottom of the display area 16, but it will be understood that the buttons 18 and 20 may be displayed anywhere on the screen 12. The keypad 14 is another user input device and may include alphanumeric keys and/or function keys such as arrows keys which may be duplicative of or independent of functions which are controlled by icons or button displayed on the touch screen 12. The function keys may be hard keys (i.e., keys with fixed functions) or soft keys (i.e. keys that can be programmed to be associated with one or more selectable functions).

Figure 2A:
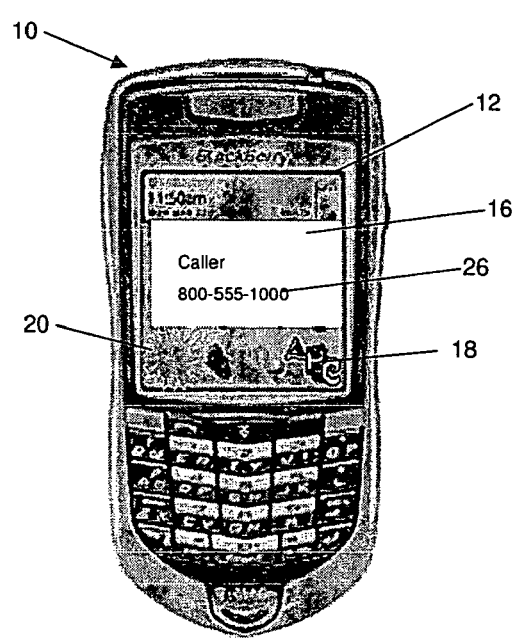
FIGS. 2A-2B show the example handheld device in FIG. 1 with different character displays resulting from the adjustment of the character presentation.

FIG. 2A shows the display area 16 after the telephone icon 24 in FIG. 1 has been selected. The display area 16 in FIG. 2A is configured as a telephone function screen which shows various characters to the user of the PDA/telephone 10. For example, a person's name and/or phone number, the number of an incoming call, and/or the phone number of a phone call made by the user may be displayed. Telephone function screens may include for example a dialing screen, an addressing screen or a call in progress screen.

Figure 2B:
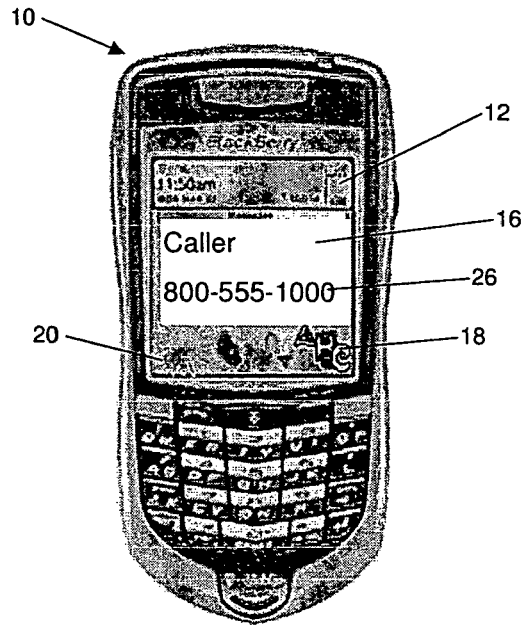

In the examples of FIGS. 2A & 2B, a phone number 26 is displayed in the display area 16. The characters of the phone number 26 are displayed in a certain default font size in FIG. 2A. When the user selects or taps on the size button 18 displayed on display area 16 in either FIG. 1 or FIG. 2A, the font size of the characters of the phone number 26 increase in size as shown in FIG. 2B. Thereafter, in subsequent displays, the characters stay in the changed font size. When, at a subsequent time, a user taps on the size button 18 again, the font size of the example characters in the display area 16 increase to a maximum size. Subsequently, when a user taps on the size button 18 again, the font size of the characters of the phone number return to the size shown in FIG. 1. Of course it will be understood by those of ordinary skill in the art that any number of different font sizes may be sequentially displayed (e.g., two, three, four etc.). It is also to be understood that the change in font size is not restricted to phone numbers, but may include any character displayed on the screen area 16. It is also to be understood that in addition to or instead of changing the font size, selection of the button 18 may change other display characteristics, for example, in order to make the text more or less distinct, such as the color, the font type, the style etc.

The brightness button 20 allows the brightness of the screen 12 to be adjusted with a single touch. The screen 12 is lit with a lighting device such as a backlight which has a brightness level for the screen 12. Selecting or touching the brightness button 20 increases the brightness of the screen 12 via for example a backlight or the individual pixels by an incremental amount such as 25%. A second touch of the brightness button 20 increases the brightness of the screen 12 by an additional increment such as 35%. A third touch of the brightness button 20 changes the brightness of the screen 12 to another level (e.g. back to the original level). Of course, those of ordinary skill in the art will recognize that different levels of brightness may be used than the two levels described here and/or the same or different values of brightness from those described above may be used for any of these.

The size button 18 and the brightness button 20 remain on the screen 12 regardless of selection of different displays on the screen area 16 for example the icons screen shown in FIG. 1 and the dialing information in FIGS. 2A & 2B. Thus, a user may quickly and efficiently adjust either character display or brightness regardless of the functions activated by the PDA/telephone 10. Further, such changes to either character display or brightness remain fixed independent of different screens navigated on the screen area 16.

Figure 3:
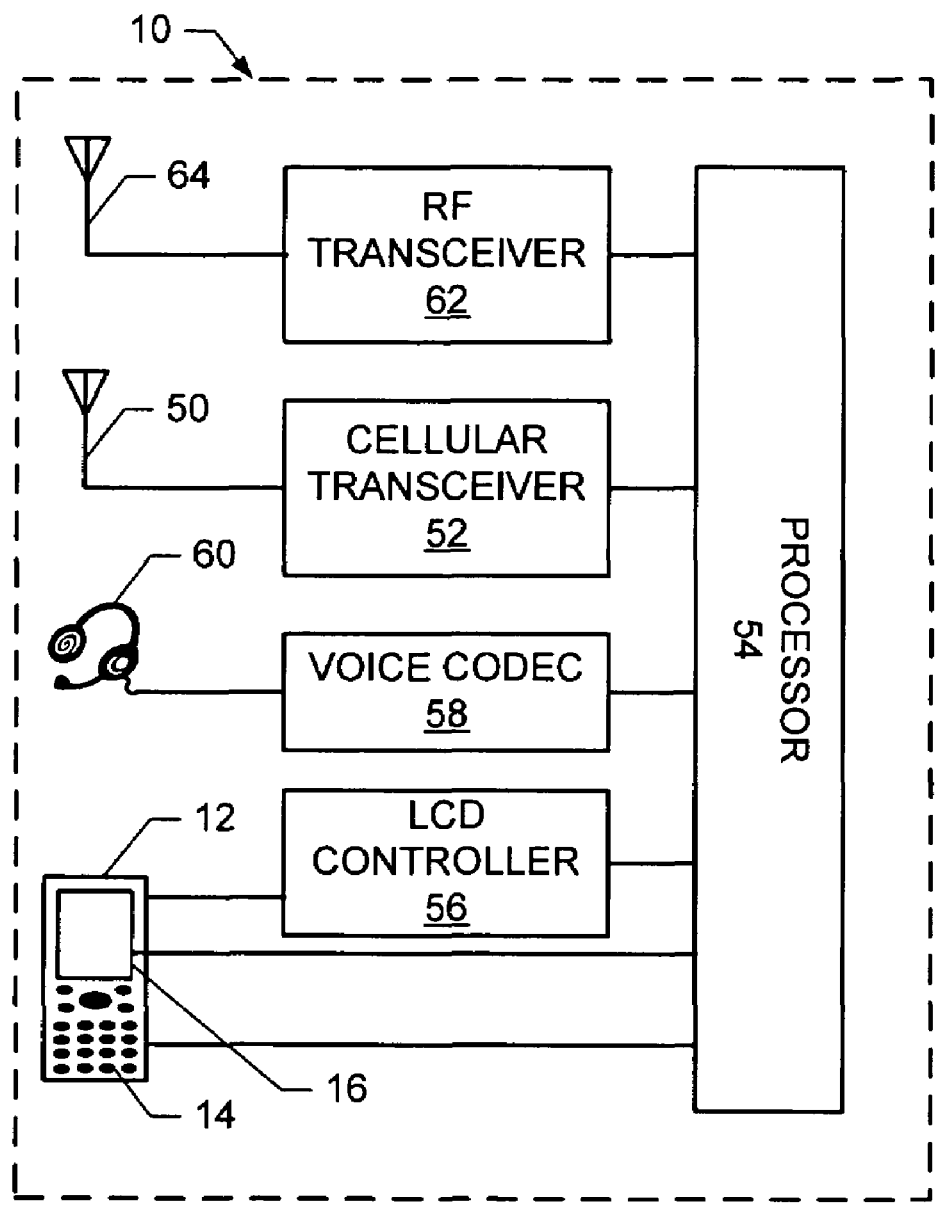
FIG. 3 is a block diagram of the hardware components of the example handheld device in FIG. 1.

FIG. 3 illustrates an example manner of implementing at least a portion of the PDA/telephone 10 of FIG. 1. To support wireless communications with a cellular communications network, the example PDA/telephone 10 of FIG. 3 includes any of a variety of cellular antenna 50 and any of a variety of cellular transceiver 52. The example antenna 50 and the example cellular transceiver 52 of FIG. 3 are able to receive, demodulate and decode cellular signals transmitted to the PDA/telephone 10 by, for instance, a cellular communications network. Likewise, the cellular transceiver 50 and the cellular antenna 52 are able to encode, modulate and transmit cellular signals from the example PDA/telephone 10 to the cellular communications network.

To process received and decoded signals and to provide data for transmission, the illustrated example PDA/telephone 10 of FIG. 3 includes a control circuit such as a processor 54. The processor 54 may be any variety of processor such as, for example, a microprocessor, a microcontroller, a digital signal processor (DSP), an advanced reduced instruction set computing (RISC) machine (ARM) processor, etc. In general, the processor 54 executes machine readable instructions stored in a memory to control the example PDA/telephone 10 of FIG. 3 and/or to provide one or more of a variety of user interfaces (e.g. touch screen 12 or keypad 14), applications, services, functionalities implemented and/or provided by the example PDA/telephone 10 of FIG. 3.

In addition to handling receive and/or transmit data, the processor 54 may receive user inputs and/or selections, and/or provide any variety and/or number of user interfaces for a user of the example PDA/telephone 10. For example, the processor 54 may receive inputs and/or selections made by a user via the keypad 14 or the screen area 16, and/or provide a user interface, including generating characters, on the display 12 via a display controller 56.

To provide, for example, telephone services, the example PDA/telephone 10 of FIG. 3 includes any of a variety of voice coder-decoder (codec) 58 and any variety of input and/or output devices such as, for instance, a jack for a headset 60. The handset 60 includes an earpiece for broadcasting voice signals and a microphone for input of voice signals. In particular, the processor 54 can receive a digitized and/or compressed voice signal from the headset 60 via the voice codec 58, and then transmit the digitized and/or compressed voice signal via the cellular transceiver 52 and the antenna 50 to the cellular communications network. Likewise, the processor 54 can receive a digitized and/or compressed voice signal from the cellular base station and output a corresponding analog signal via, for example, the headset 60 for listening by a user.

To support additional or alternative communication services, the example PDA/telephone 10 of FIG. 3 may include any of a variety and/or number of RF antennas 62 and/or RF transceivers 64. An example RF antenna 62 and the example RF transceiver 64 support wireless communications based on the IEEE 802.11 (a.k.a., WiFi) standard. Additionally or alternatively, the RF transceiver 64 may support communications based on one or more alternative communication standards and/or protocols. Alternatively, the cellular antenna 50 may be used by the RF transceiver 52. Further, a single transceiver may be used to implement both the cellular transceiver 52 and the RF transceiver 64.

In the illustrated example of FIG. 3, the processor 54 may use the RF transceiver 64 to communicate with, among other devices, a WiFi access point, an RF terminal, etc. For instance, the example RF transceiver 64 of FIG. 3 may be used to enable the example PDA/telephone 10 to connect to the Internet and/or a web server via an RF terminal.

Although an example PDA/telephone 10 has been illustrated in FIG. 3, user devices may be implemented using any of a variety of other and/or additional devices, components, circuits, modules, etc. Further, the, devices, components, circuits, modules, elements, etc. illustrated in FIG. 3 may be combined, re-arranged, eliminated and/or implemented in any of a variety of ways.

Figure 4:
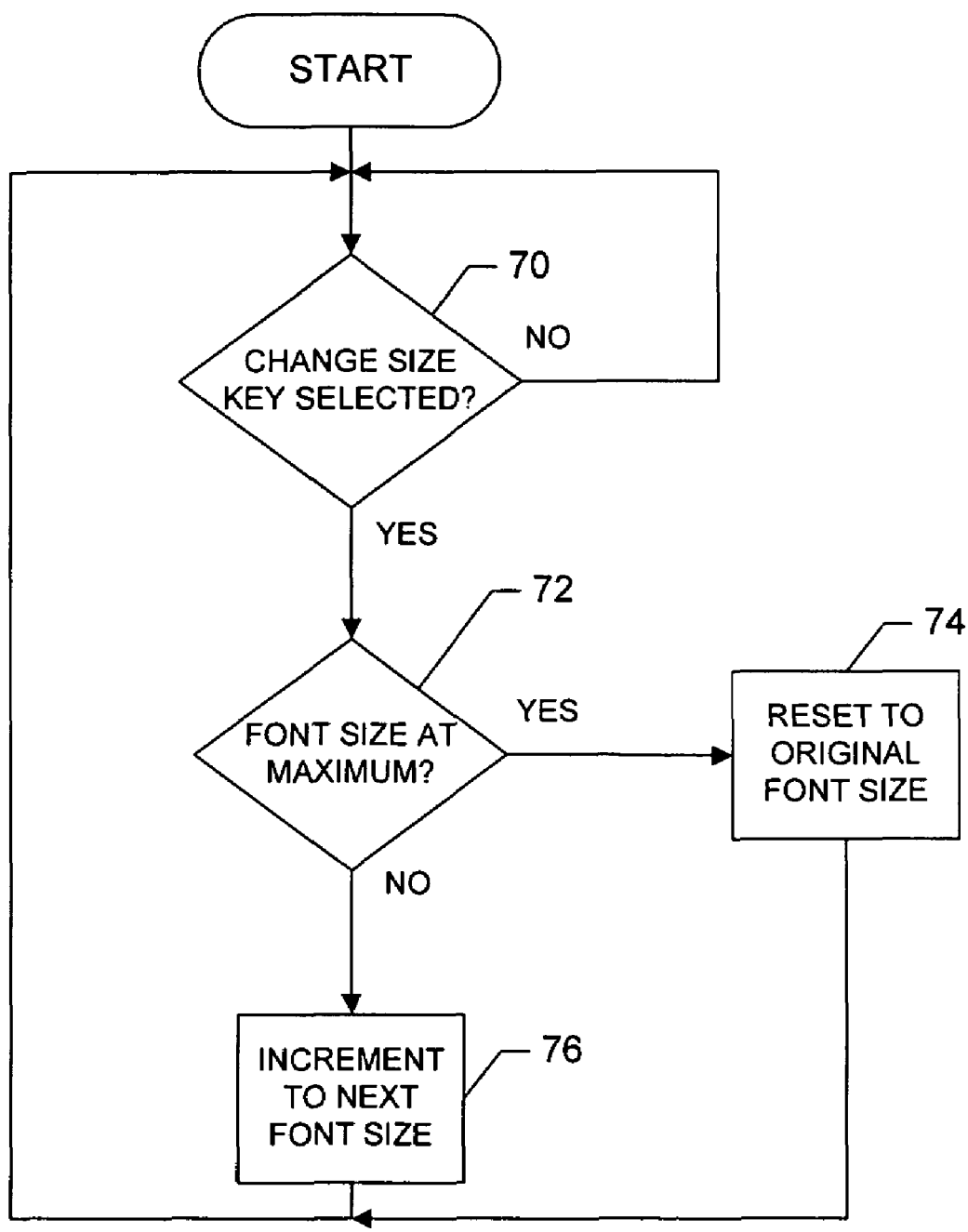
FIG. 4 is a flow diagram showing the process used by the example handheld device in FIG. 1 to provide for the convenient screen based adjustment of character presentation.

FIG. 4A shows a flow diagram of the process used by the microprocessor 54 on the example PDA/telephone 10 in FIG. 2 to adjust the display characteristics. The microprocessor 54 first determines whether the size button 18 has been selected in block 70. If the size button 18 has been selected, the microprocessor 54 determines whether the character is at the maximum font size in block 72. If the size button 18 has not been selected, the microprocessor 54 returns to block 70. If the character is at a maximum font size, the microprocessor 54 will proceed to block 74 and reset the character to the original font size. The microprocessor 54 will then proceed back to block 70. If the character is not the maximum font size in block 72, the microprocessor will proceed to block 76 and increment the character to the next font size and return to block 70.

Figure 5:
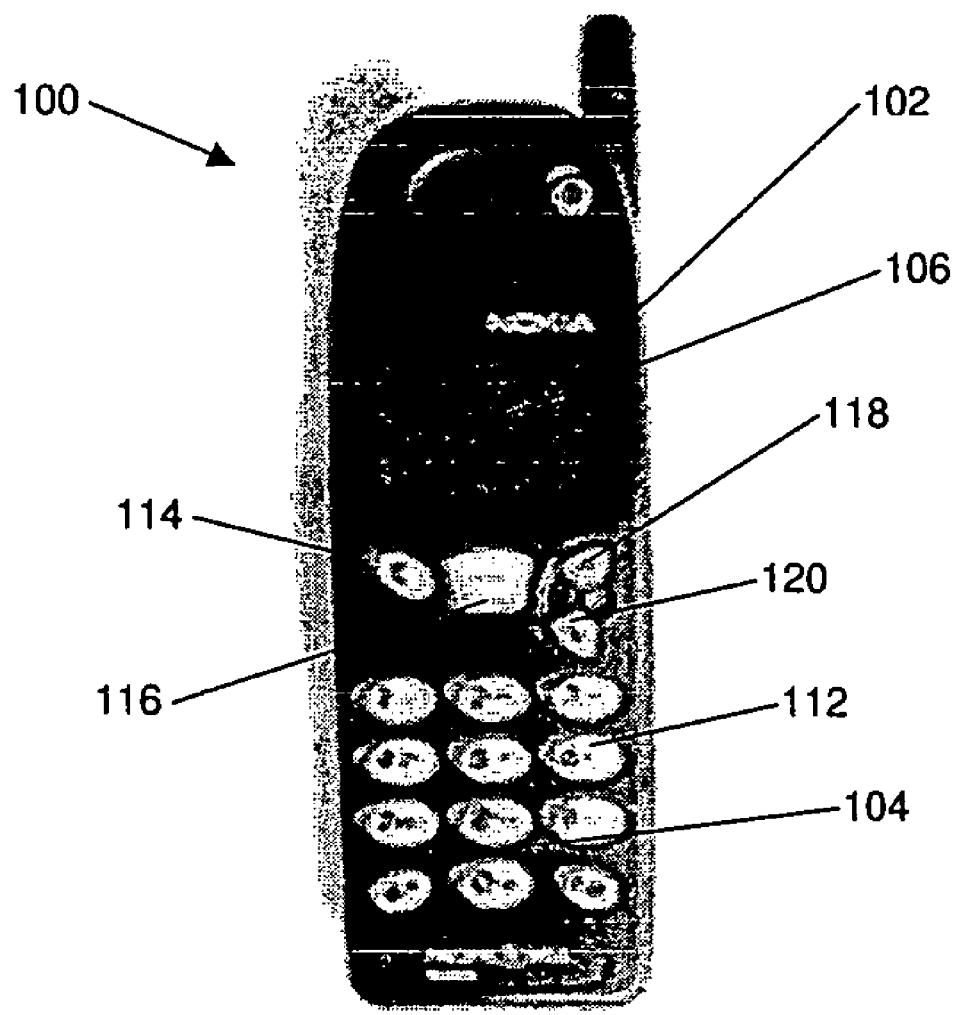
FIG. 5 shows another example handheld device which provides for a convenient keypad adjustment of character presentation.

FIG. 5 shows another example handheld device which is a cellular telephone 100 which allows a user to conveniently change the display of the character format. In this example, the cellular telephone 100 includes a screen 102 and a user input device such as a keypad 104. The screen 102 includes a display area 106 which shows alphanumeric characters and/or icons. The screen 102 in the illustrated example is an LCD but other suitable displays such as plasma, backlit LCD etc. may be used. The screen 102 has a certain default brightness level which is automatically activated whenever the user touches the screen 102 or any key on the keypad 104.

The keypad 104 has a series of alpha numeric keys 112 which enable a user to enter characters such as numbers or symbols. A call/enter button 114 allows a user to initiate functions selected on the screen 112 for example selection of a highlighted menu selection or icon (e.g. to make a call). A stop button 116 allows a user to terminate the function currently performed by the cell phone 100. The above buttons may be hard keys (i.e., keys with fixed functions) or soft keys (i.e. keys that can be programmed to be associated with one or more selectable functions).

The keypad 114 also includes a control device area which may include a character size key 118 and a brightness key 120. In this example the keys 118 and 120 are located on the top of the keypad 104 just below the bottom of the screen 102 for operating convenience of the user. It is to be understood that the keys 118 and 120 may be located anywhere on the cell phone 100 including but not limited to the sides of the cell phone 100, the area above the screen 102 or elsewhere.

Figure 6A:
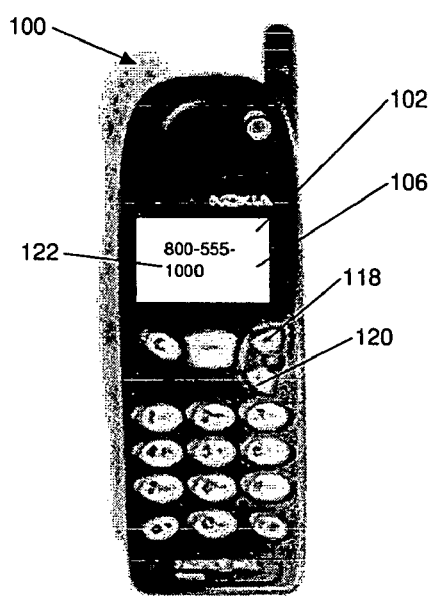
FIGS. 6A-6B show the example handheld device in FIG. 5 with different character displays resulting from the adjustment of the character presentation.
Figure 6B:
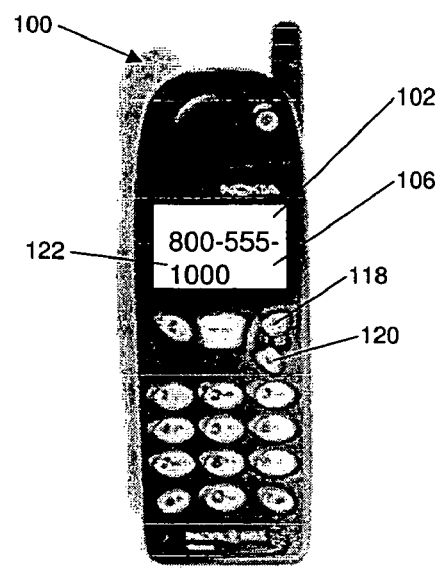

When the telephone 100 in FIG. 5 is activated (typically by pressing the enter button 114), the display area 106 shows various characters which reflect information for useful to the user of the telephone 100 as shown in FIG. 6A. For example, a person's name and phone number, the number of an incoming call, or the phone number of a phone call made by the user may be displayed. In this example, a phone number 122 is displayed in the display area 106 in FIG. 6A. The characters of the example phone number 122 are in a certain default font size in FIG. 6A. When the user selects the size key 118, the font size of the characters of the phone number 122 increase in size as shown in FIG. 6B. When a user selects the size key 118 again, the font size of the characters in the display area 106 increase to a maximum size. When a user taps on the size key 118 again, the font size of the characters of the phone number return to the size shown in FIG. 6A. Of course it is to be understood by those of ordinary skill in the art that more than three different font sizes may be displayed. Also, different character features such as font type, color, style etc. may be changed via a key similar to the size key 118 or another key.

The brightness key 120 allows the brightness of the screen 102 to be adjusted with a single touch. Selecting the brightness key 120 increases the brightness of the screen 102 by an incremental amount such as 25%. A subsequent selection of the brightness key 102 increases the brightness of the screen 102 by an additional increment such as 35%. A third selection of the brightness key 120 changes the brightness of the screen 102 back to the original level. Of course, those of ordinary skill in the art will recognize that different levels of brightness may be used than the two levels described here and/or the same or different values of brightness from those described above may be used for any of these.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture.

What is claimed is:

1. A handheld device comprising:
   a receiver to receive wireless signals;
   a transmitter to send wireless signals;
   a screen to display an alphanumeric character, the alphanumeric character being displayable in at least two different font sizes;
   a memory to store at least one set of processor instructions involving the display of an alpha numeric character;
   a screen light;
   a processor coupled to the screen, the screen light, the memory, the receiver and the transmitter, the processor to execute the at least one set of processor instructions;
   a first user input device to enable selection between the at least two different font sizes;
   a second user input device to increase or decrease the brightness of the screen light; and
   wherein the processor is responsive to the first user input device to change the font size of the alphanumeric character and is responsive to the second user input device to increase or decrease the brightness of the screen light; wherein the screen has multiple displays, each of the displays corresponding to a respective operation of the device, the first and second user inputs being activatable in each of the multiple displays such that the font size and the brightness are each user controllable via a single-touch of a respective one of the first and second input devices from each of the displays, the font size and brightness selected by the user remaining fixed independent of navigation between the displays.

2. The handheld device in claim 1 wherein the screen is a touch screen and the first user input device is an area of the screen.

3. The handheld device in claim 1 further comprising a keypad, wherein the first user input device is a key on the keypad.

4. The handheld device in claim 1 wherein the alphanumeric character has an original font size and wherein the processor is responsive to a first user touch of the first user input device to increase the font size to a first size, and the processor is responsive to a second user touch of the first user input device to increase the character font size to a second size.

5. The handheld device in claim 4 wherein when a user touches the first user input device a third time, the character font size changes to the original font size.

6. The handheld device in claim 1 wherein the handheld device is a telephone.

7. The handheld device in claim 1 wherein the handheld device is a PDA.

8. The handheld device in claim 1 wherein the wireless signals are voice signals.

9. The handheld device in claim 1 wherein the wireless signals are Internet based data.

* * * * *